(No Model.) 9 Sheets—Sheet 2.
G. H. PERKINS.
MACHINE FOR FILLING CANS.
No. 383,981. Patented June 5, 1888.
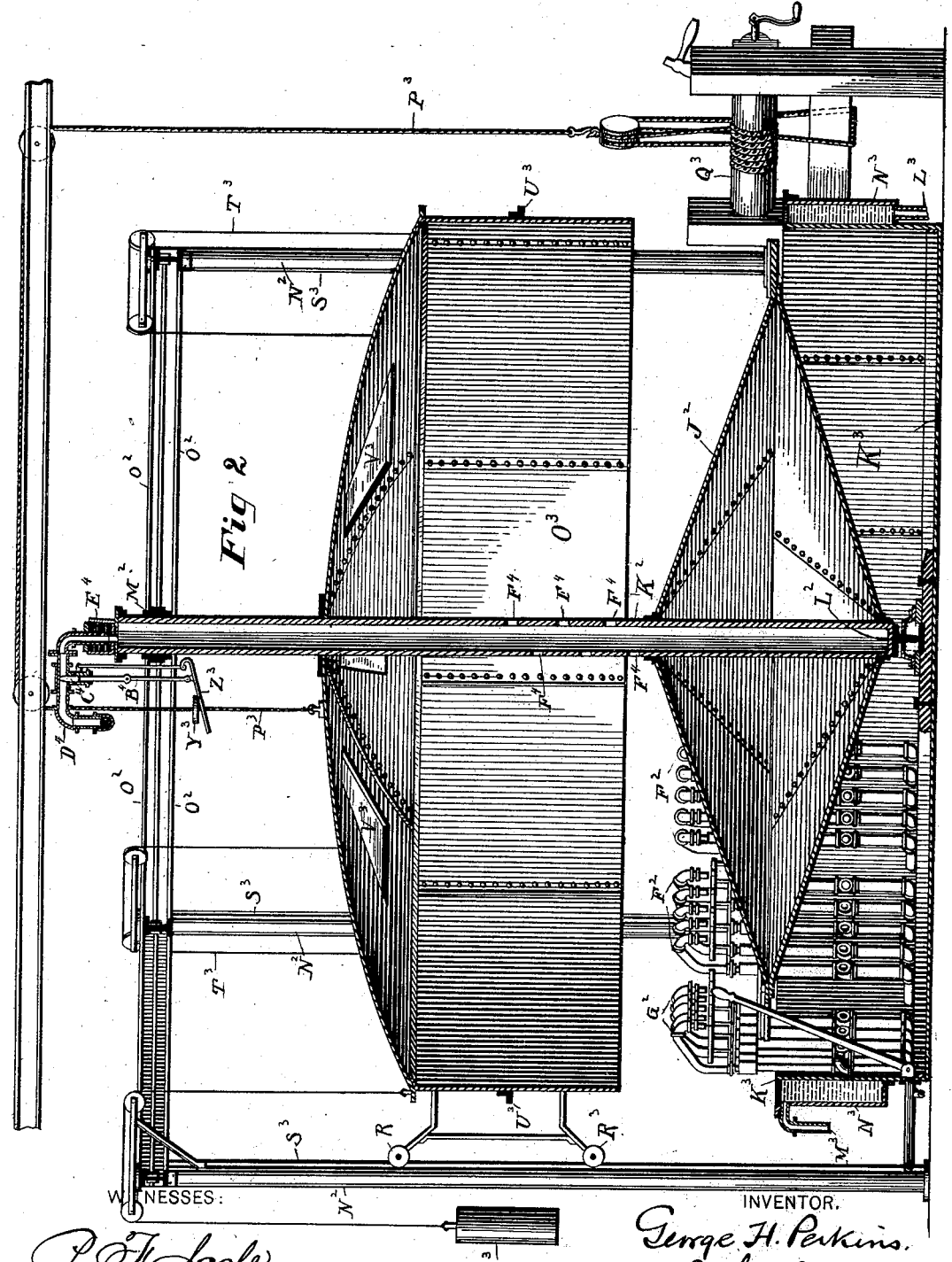

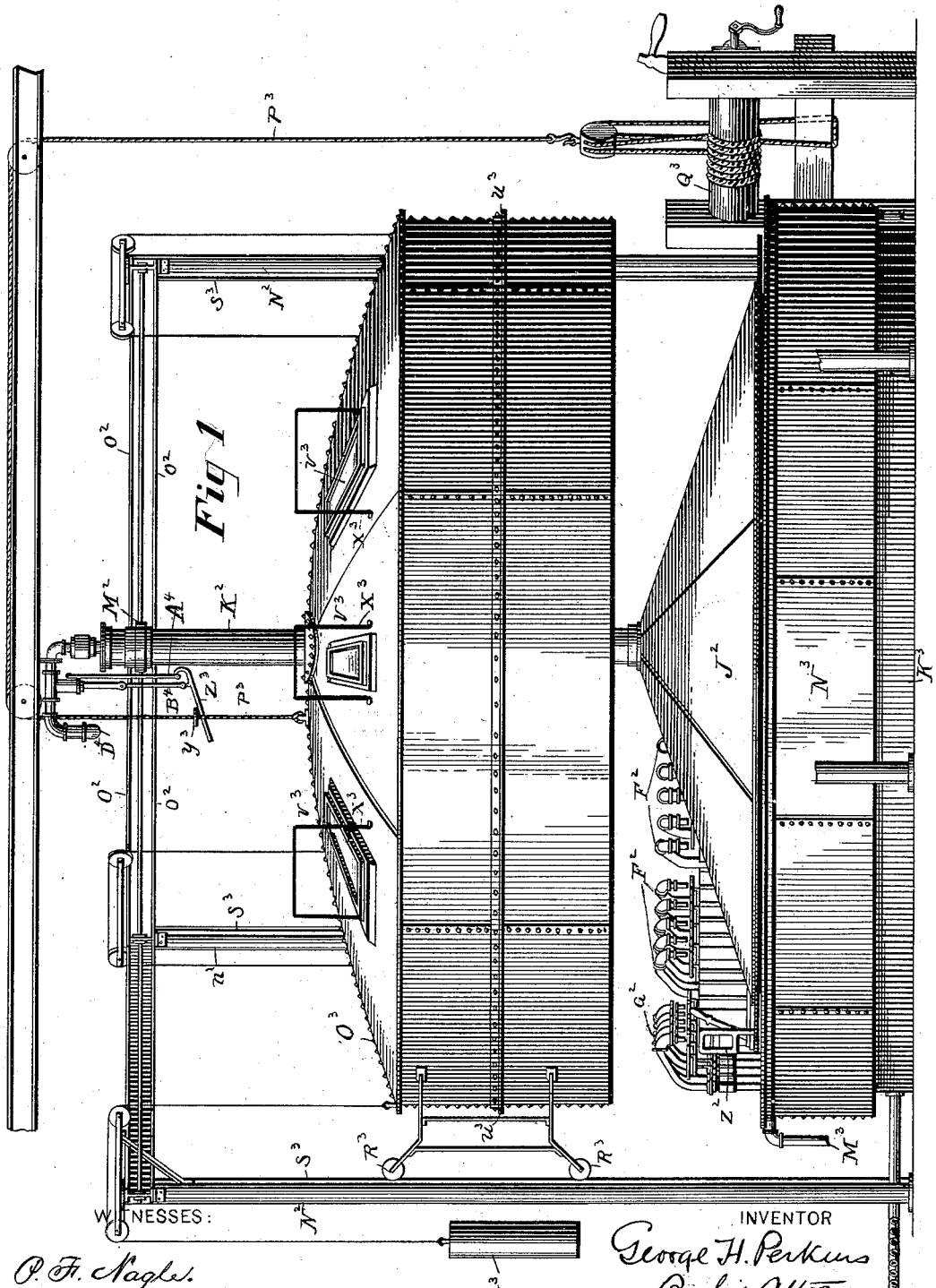

(No Model.)  9 Sheets—Sheet 3.
G. H. PERKINS.
MACHINE FOR FILLING CANS.
No. 383,981. Patented June 5, 1888.
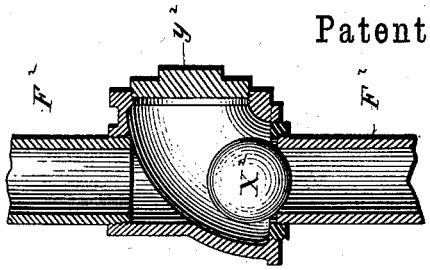
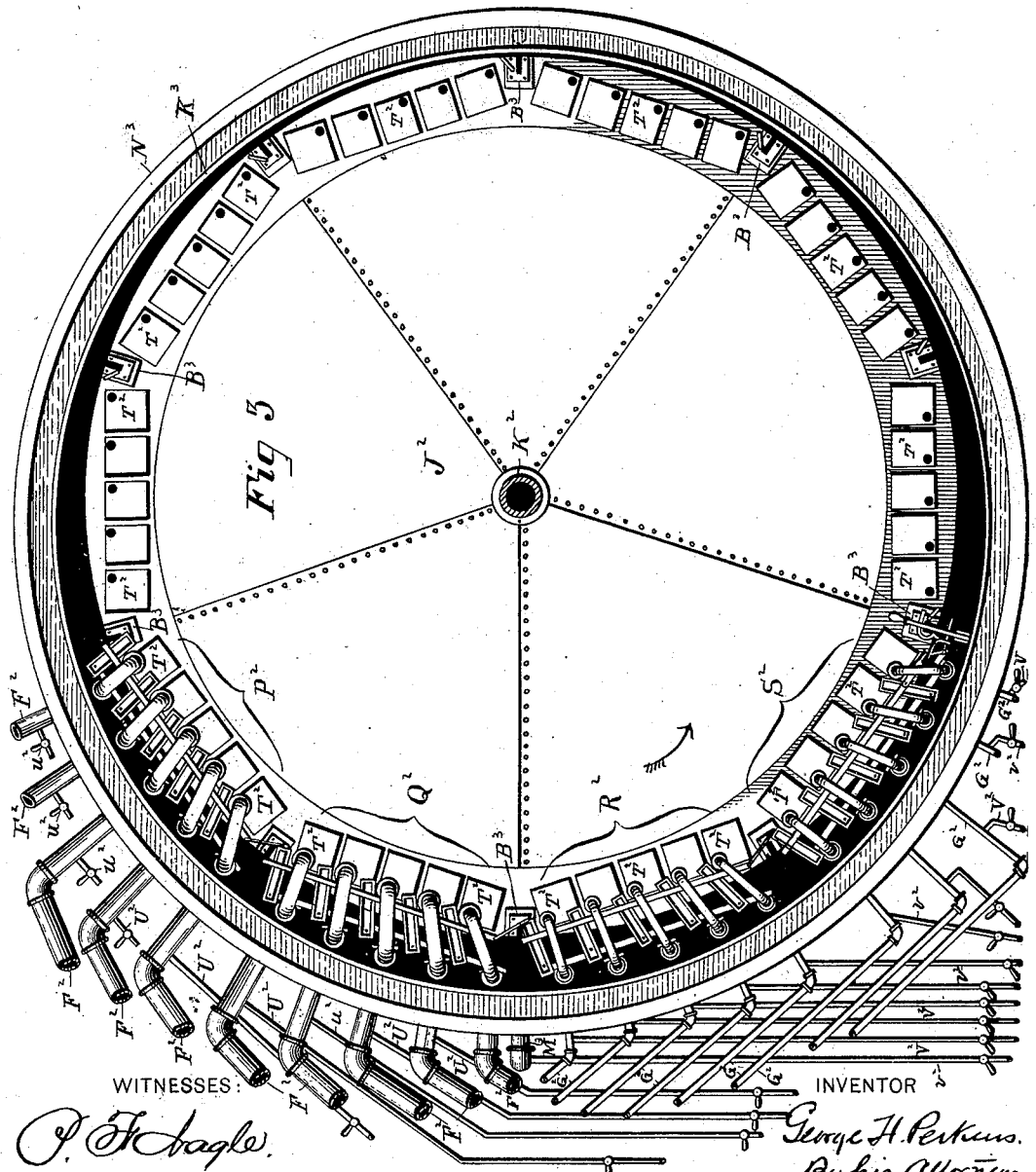

(No Model.) 9 Sheets—Sheet 4.
G. H. PERKINS.
MACHINE FOR FILLING CANS.
No. 383,981. Patented June 5, 1888.
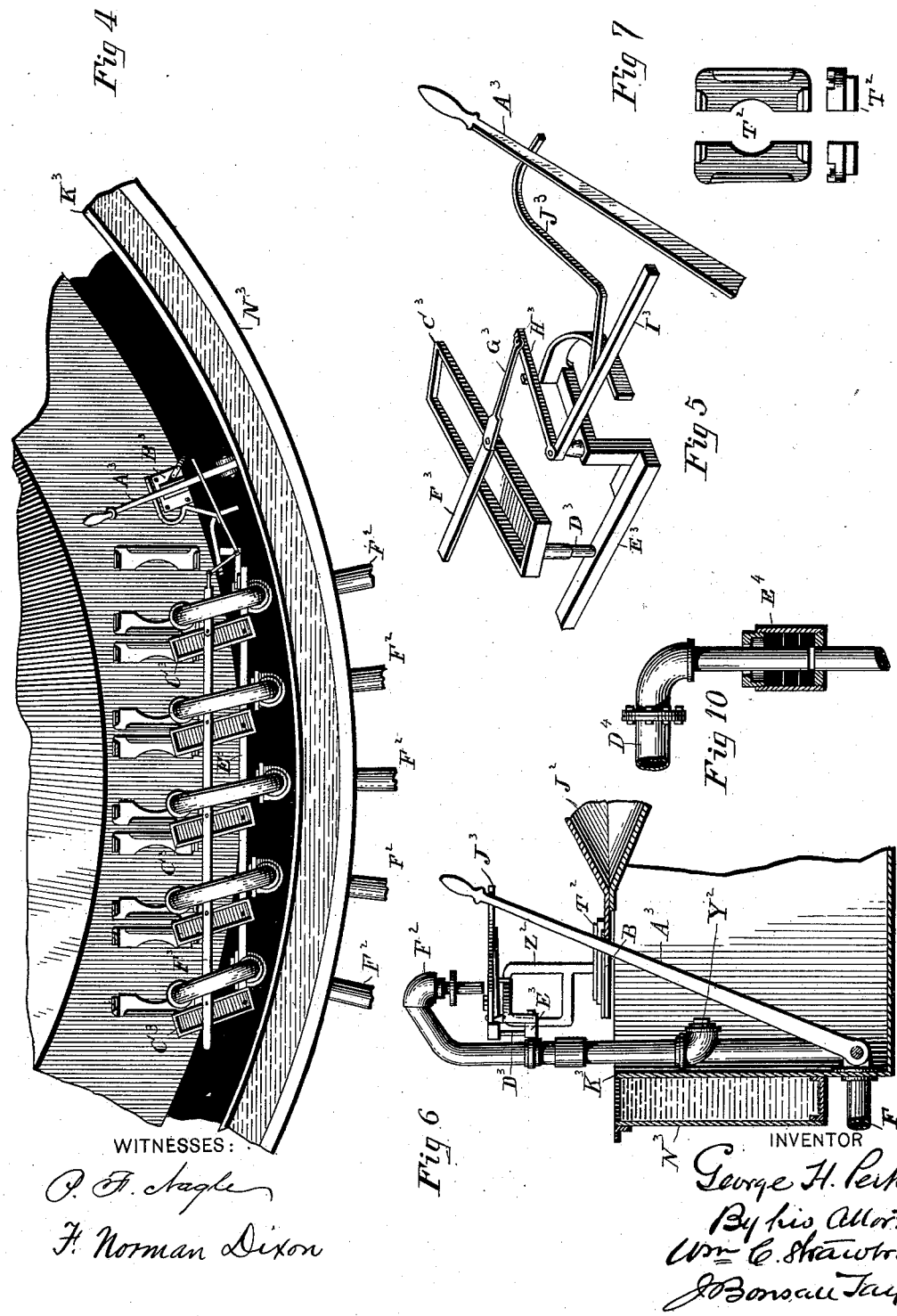
WITNESSES:
O. F. Nagle
F. Norman Dixon
INVENTOR
George H. Perkins
By his Attorneys
Wm. C. Strawbridge
J. Bonsall Taylor (No Model.) 9 Sheets—Sheet 5.
G. H. PERKINS.
MACHINE FOR FILLING CANS.
No. 383,981. Patented June 5, 1888.
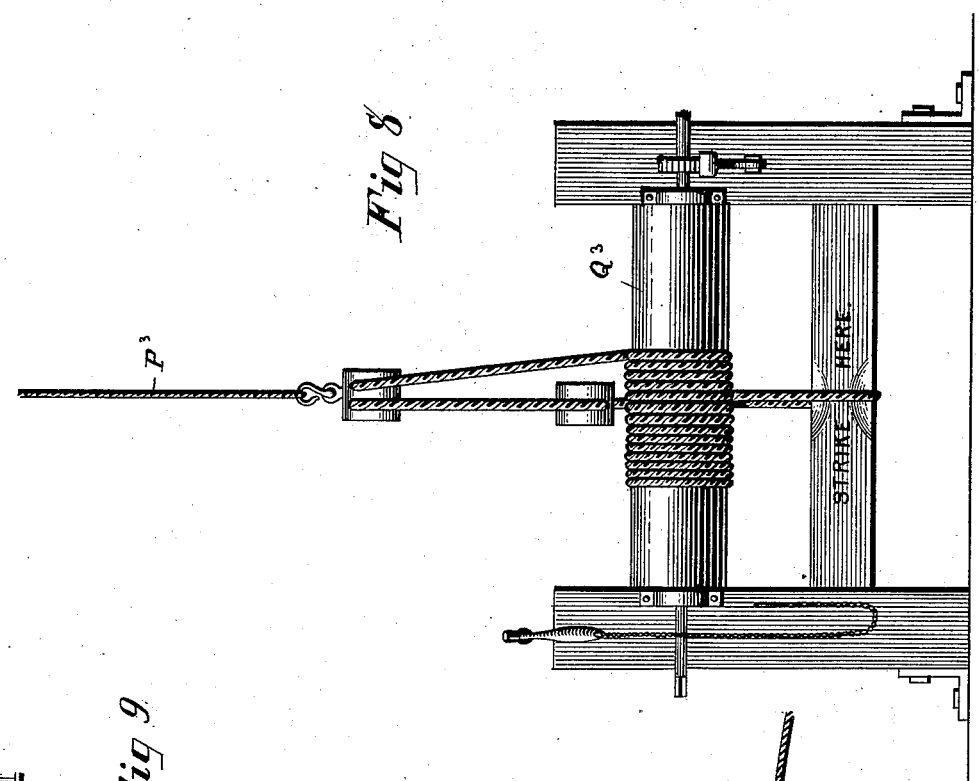
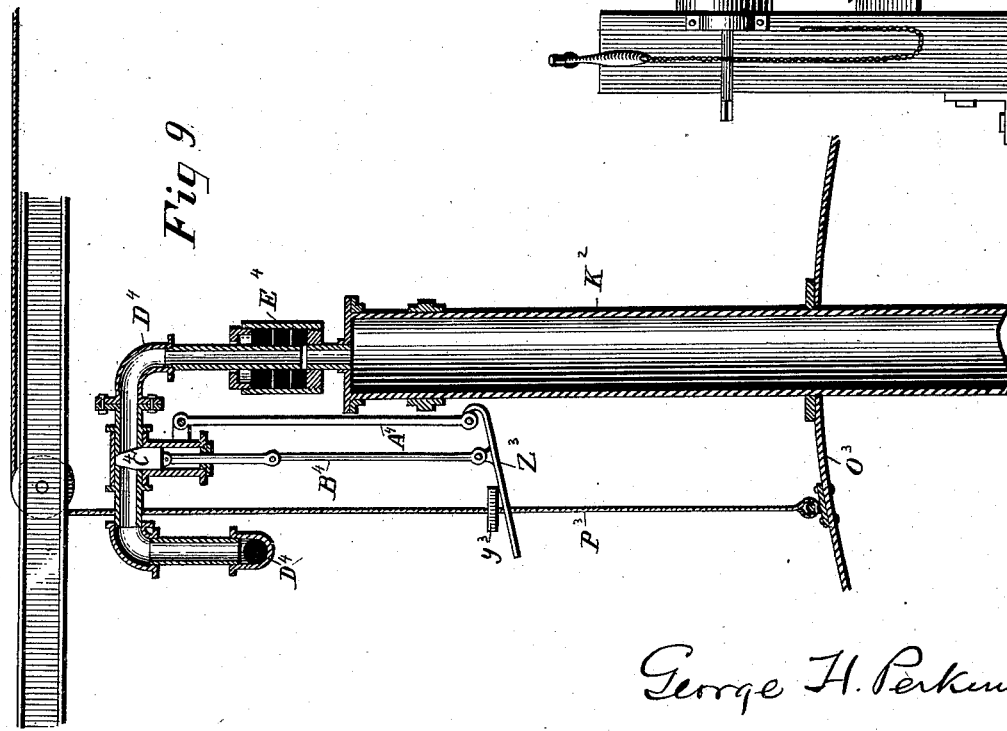

(No Model.)
9 Sheets—Sheet 6.
G. H. PERKINS.
MACHINE FOR FILLING CANS.
No. 383,981. Patented June 5, 1888.
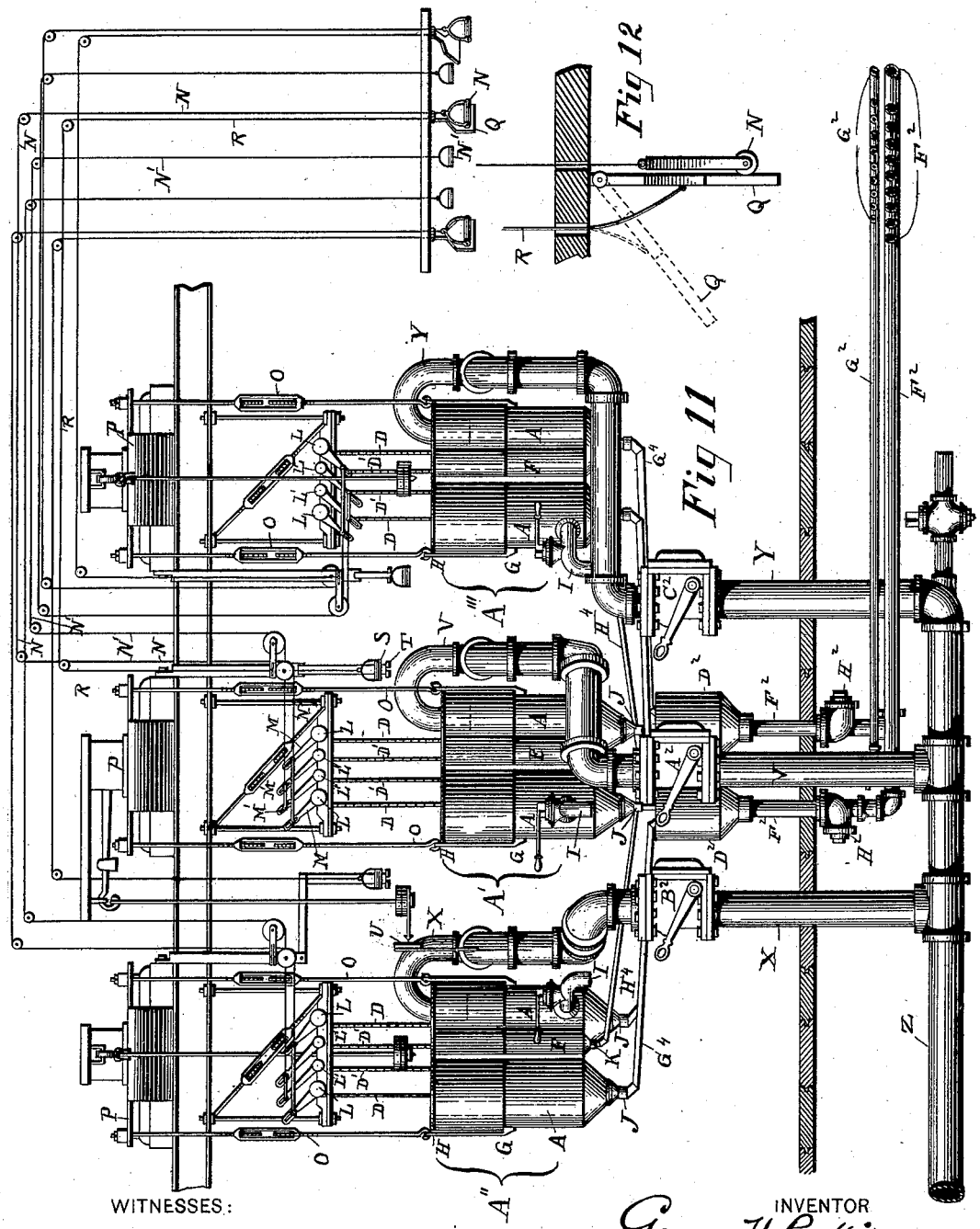
WITNESSES:
P. F. Nagle.
F. Norman Dixon.
INVENTOR
George H. Perkins
By his Attorneys
Wm. C. Strawbridge
J. Bonsall Taylor (No Model.) 9 Sheets—Sheet 7.
G. H. PERKINS.
MACHINE FOR FILLING CANS.
No. 383,981. Patented June 5, 1888.
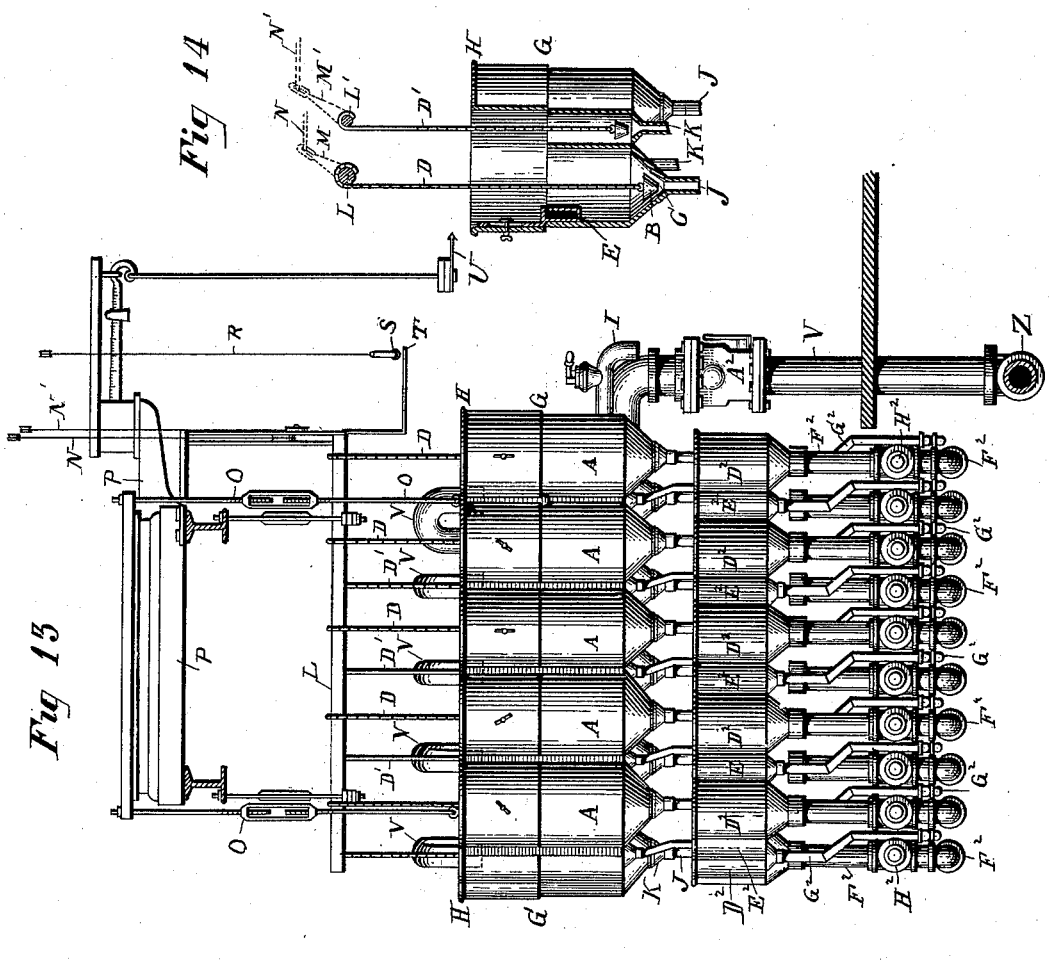

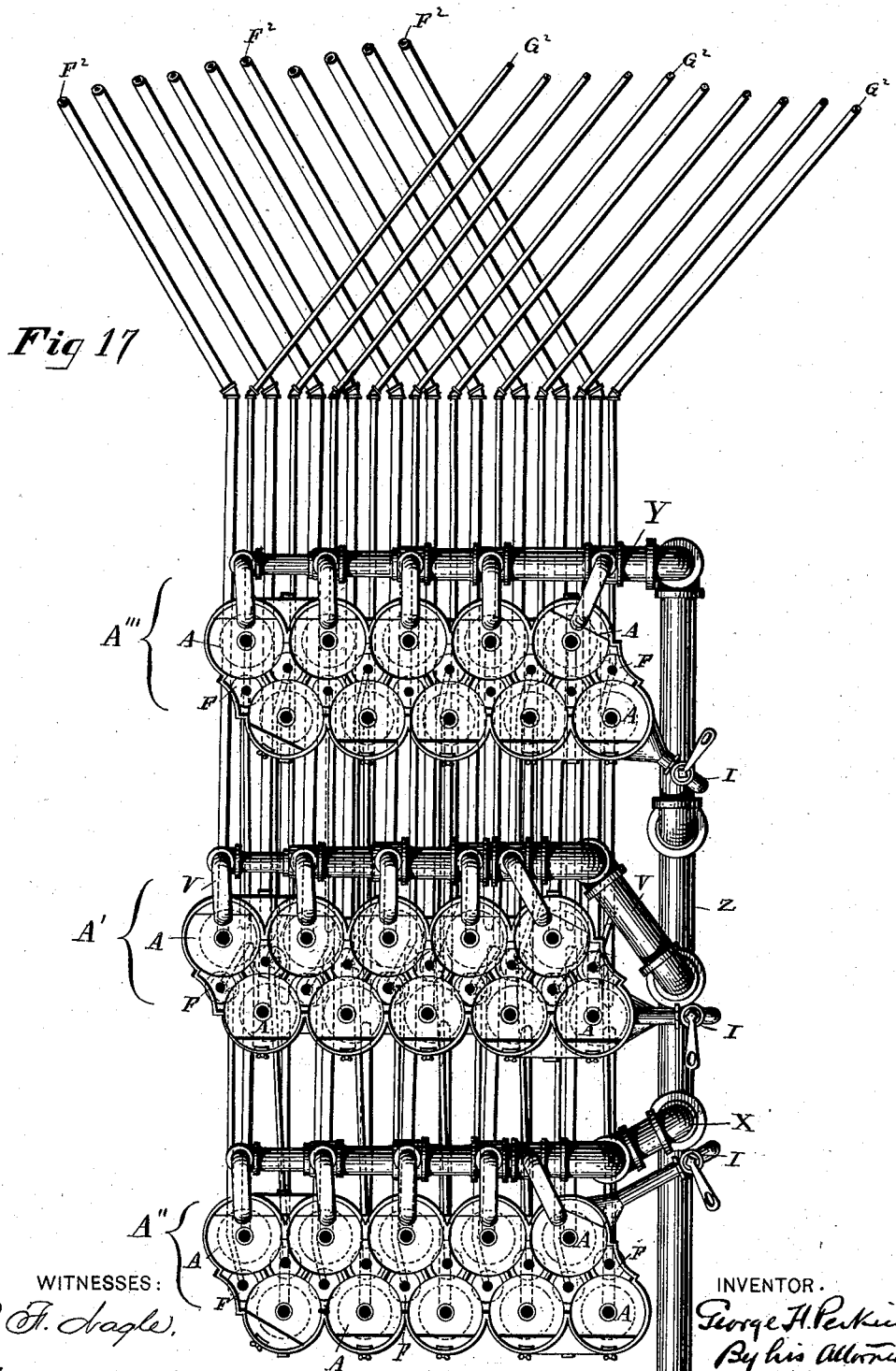

(No Model.) 9 Sheets—Sheet 9.
G. H. PERKINS.
MACHINE FOR FILLING CANS.
No. 383,981. Patented June 5, 1888.
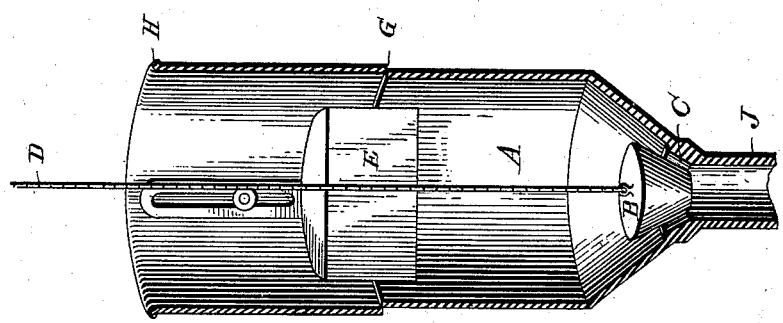
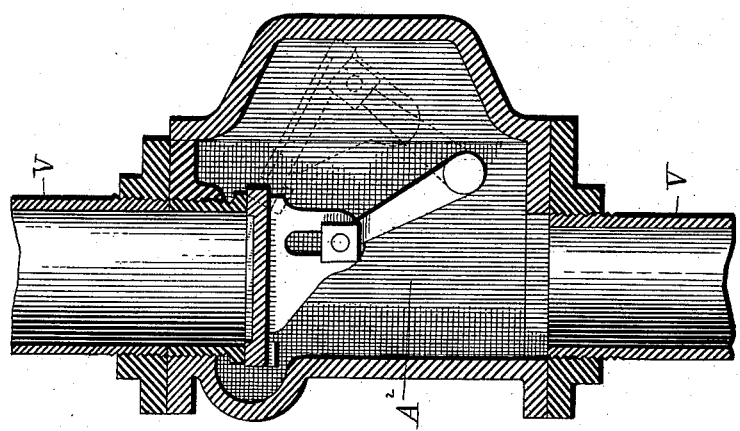
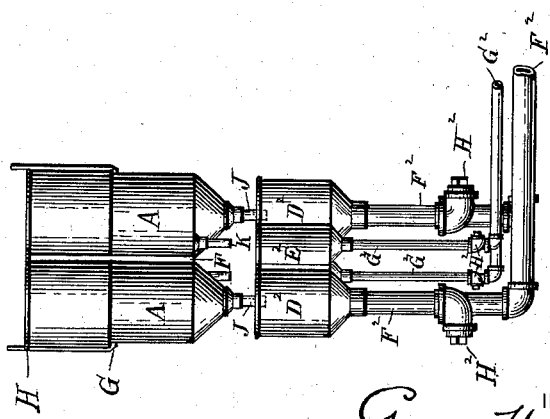
WITNESSES:
P. F. Nagle.
F. Norman Dixon.
INVENTOR
George H. Perkins.
By his Attorneys
Wm. C. Strawbridge
J. Bonsall Taylor

UNITED STATES PATENT OFFICE.

GEORGE H. PERKINS, OF PHILADELPHIA, PENNSYLVANIA.

MACHINE FOR FILLING CANS.

SPECIFICATION forming part of Letters Patent No. 383,981, dated June 5, 1888.

Application filed July 25, 1887. Serial No. 245,160. (No model.)

*To all whom it may concern:*

Be it known that I, GEORGE H. PERKINS, a citizen of the United States, residing in the city and county of Philadelphia in the State of Pennsylvania, have invented an Apparatus for Filling Cans, of which the following is a specification.

My invention relates particularly to that class of apparatus which is employed for the filling of cans with petroleum or its products, and by means of which each of a number of cans are simultaneously supplied with a predetermined quantity of oil. In the use of apparatus heretofore devised for this purpose danger from fire has been occasioned by reason of the formation of foam and petroleum vapor by the rapid inrush of oil to the filling boxes from the service pipes and by the rapid filling and consequent overflowing of the cans, and by the sealing of the cans, by overheated soldering irons, in the explosive atmosphere thus formed.

The object of my present invention is to provide apparatus by which the dangers referred to may be obviated.

In the apparatus heretofore devised and used by me for filling cans with petroleum a turn table was employed upon which the cans to be filled were mounted, in the same building with this turn table, and over one side of it, a filling box was provided which was adapted to be discharged into a series of empty cans as such cans were brought under it in the revolution of the turn table. This turn table, with its attachments, together with said filling box and its attachments, were located in close proximity to each other in the same building.

In my present invention the filling box, and its attachments, are located in a fire-proof building, and the turn table, and its attachments, are located in a separate building, proper devices being provided for connecting the filling boxes with and discharging them into the cans mounted upon said turn table, and, as will be hereinafter more fully and particularly described, devices being provided for inclosing and protecting the turn table and its attachments from fire.

In the drawings, Figure 1 is an elevation of that part of my invention which pertains to the turn table and its attachments, and to the inclosing hood and its attached devices. Fig. 2 is an elevation, partly in section, of the devices shown in Fig. 1. Fig. 3 is a plan view of the turn table, and its attachments, shown in Fig. 1. Fig. 4 is a detail plan view of part of the turn table, and its attachments, shown in Fig. 3. Fig. 5 is a perspective view of one of the drip pans, and its attached levers, shown in Figs. 3 and 4. Fig. 6 is a detail radial elevation, partly in section, of the devices shown in Fig. 4. Fig. 7 is a plan view, and end elevation, of one of the can supports upon the turn table as shown in Fig. 4. Fig. 8 is a front elevation of the windlass to which the end of the rope, or cable, which supports the turn table hood, is attached. Fig. 9 is a detail view of part of the central post of the turn table, and of the automatic steam valve and its attached appliances, for admitting steam to the turn table hood. Fig. 10 is a detail view of part of Fig. 9. Fig. 11 is a side elevation of the filling boxes, and of their attachments and connections. Fig. 12 is a detail end view of the handles for operating the wires attached to the filling box valves and of the handle guards. Fig. 13 is a side elevation of one set of filling boxes and of their attachments and connections. Fig. 14 is an end elevation, partly in section, of the filling boxes shown in Fig. 13, and of part of the devices for operating the valves. Fig. 15 is a vertical sectional elevation of one of the valves with which the funnel pipes of the filling boxes are provided. Fig. 16 is a vertical sectional elevation of one of the valves with which said pipes, at their ends in proximity to the turn table, are provided. Fig. 17 is a top plan view of the three sets of filling boxes shown in Fig. 11, and of part of their attachments. Fig. 18 is an end elevation of one of the three sets of filling boxes shown in Fig. 11 and of their funnels and funnel pipes. Fig. 19 is a sectional elevation of one of the valves with which each of the service pipes leading to each of the filling boxes is provided. Fig. 20 is an elevation, partly in section, of one compartment of one of the filling boxes, showing the valve, valve seat, and the adjustable displacing block.

As already stated, the danger from fire resulting from the use of known forms of apparatus for filling cans with crude petroleum is occasioned by the liability of crude petroleum, in pouring, to foam or boil up and overflow the vessels into which it is poured and thus produce an atmosphere of petroleum vapor or mist, in which, up to the present time, the operation of soldering or sealing the cans by a hot soldering iron has been conducted.

It is the purpose of my present invention to provide an apparatus not only to prevent the liability of fire or explosion in the operation of filling cans with crude petroleum, and of soldering them with hot soldering irons, but also to afford means for extinguishing fires should they result in the use of the apparatus hereinafter described.

By my present invention the formation of petroleum mist or vapor in the vicinity of the place of the soldering or sealing of the cans is prevented by providing means for filling the oil boxes at a point remote or separate from the point of charging and soldering the cans, and in a fire proof compartment, and, by providing means for charging to the cans rapidly a predetermined quantity of oil and subsequently, after the oil foam resulting from this operation has subsided, means for charging the can with the remainder of its charge sufficiently slow to prevent the formation of foam.

In the drawings A is a compartment of a filling box, provided with a valve B, which, by gravity rests upon and in close contact with a valve seat C, this valve, by a cord or wire D, may be lifted so as to permit said compartment to be discharged of its contents.

E is a displacing block adjustably attached, in any proper manner, to the inner surface of the compartment A, and adapted to be set to vary the content capacity thereof.

Each of the filling boxes consists of ten compartments A, and ten corresponding smaller compartments F, the capacity of the compartments A being adapted to the quantity of oil which it is intended to charge from them, at a rapid rate, to said cans and the capacity of the compartments F to the quantity of oil which it is intended to charge to them at a slow rate. The individuality of the compartments A and F ends at G, a compartment common to all of said compartments being provided from G to H, with the result that oil poured into the filling box is permitted to level itself upon and completely fill the compartments A and F; if too much oil be fed to the box the excess may be drawn off through the faucet I.

In this apparatus, as I have used it, the capacity of each of the compartments A has been twenty-eight pounds and the capacity of each of the compartments F four and one half pounds,—I do not however confine myself to compartments of the capacity named.

This filling box forms the subject of an application for Letters Patent of even date herewith.

In the drawings, three sets, A', A", A''', of filling boxes are shown, the object of this construction being that the operation of filling the number of series of cans may alternately be conducted from one of said three boxes, at the same time one other of said boxes being permitted to stand for the subsidence of the oil foam, the other being simultaneously charged with oil from the service pipe.

All of the filling boxes are supported in the same manner, and are provided with the same appliances for filling them with oil and for permitting the oil to escape therefrom. The filling box A' is swung from and supported on rods O O, which, at their upper ends, are attached to platform scales P. Z is an oil service pipe leading from any convenient oil supply.

V, X and Y are filling box supply pipes, leading from the service pipe Z, and, at their exit ends, terminating in branches or forks which empty into the respective filling boxes A' A" A'''. The flow of oil into said boxes from said pipes is controlled by valves $A^2$ $B^2$ and $C^2$, of usual and well known construction. The valve cords D D of the valves B, of each of the large compartments A of the filling box A', are, at their upper ends, attached to windlasses L L housed in a frame suitably suspended from the roof of the building, or in any other proper manner. The valve cords D' D' of the valves of the small compartments F of the filling box A', are, at their upper ends, in the same manner attached to windlasses L'. The levers or handles M of the windlasses to which the valve cords D D of the compartments A are attached, are connected with a cord or wire N which is passed over suitable pulleys and terminates, at the point at which the can filling operator stands, in a depending handle N. So also the levers M' attached to the windlasses of the valve cords D' D' of the small compartments F of the filling box A' are connected with a cord or wire N' which is passed over suitable pulleys and is provided with a handle N' which depends in proximity to the handle N. The handle N is provided with a hinged guard or plate Q, which, in its normal position, and by gravity, lies in close contact with and at the side of the handle N. This hinged guard is attached to one end of a cord or wire R, which, after having been passed over suitable pulleys, is led to and terminates in a handle S at the point at which the operator stands while engaged in the operation of charging the filling box A'. In this position of the guard it is impossible for the hand to grasp the handle N. When the handle S is depressed and caught in the fork or stop T, the guard Q will be raised away from and out of contact with the handle N, in which position the said handle may be grasped by the hand.

Each of the compartments of the filling boxes A' A" A''' is, at its lower end, provided with contracted nozzles J K through which the contents of the compartments of the said boxes may, upon the raising of the valves, be allowed to escape. The nozzles of the compartments of the filling box A' open above and into funnels $D^2$ $E^2$, the funnels $D^2$ being under the compartments A and the funnel $E^2$ under the compartment F.

The compartments of the filling boxes $A''$ and $A'''$ are discharged into the funnels $D^2$ $E^2$ through removable funnel pipes $G^4$ $H^4$.

The apparatus so far described, is located in a fire proof building which may be remote from the turn table and its attachments, or adjacent to it, and separated from it by a fire proof wall.

I have used the apparatus described in a large iron tank or building provided with an iron roof and with self-acting valves, opening upwardly, in said roof, the office of said valves being to prevent the destruction of the building in case of explosion. This fire proof tank or building was provided with an iron door located in close proximity to the point at which the filling box operator was stationed so as to afford easy and quick escape in case of explosion. This building was also provided with a steam supply pipe, by which, upon the turning of a valve located outside of it, the fire proof chamber could, after the closing of its door, be quickly filled with steam for the extinguishing of fire within.

The pipes $F^2$ $G^2$ may be carried underground to the point at which the turn table and its attached devices are located. $J^2$ is a turn table attached to and supported upon a central post $K^2$, which post, at its lower end, is provided with a step bearing $L^2$ of usual construction, and having its upper end passed through a collar $M^2$ attached to guy rods $O^2$ $O^2$, at their outer ends, attached to vertical posts $N^2$. This turn table is, upon its periphery, provided with ten sets or series of can-supports or rests $T^2$, five can rests being in each series, said can rests of each series being arranged in a straight line. Each of the funnel or feed pipes $F^2$ $G^2$ terminates in a goose neck, or exit orifice, which is located directly over the point occupied by the filling orifice of the can to be filled, when said can is in place upon its appropriate can rest. Five of the funnel pipes $F^2$ lead from the funnels under five of the large compartments A of the filling box $A'$ and open over and into the orifices of the cans in place upon the series of can rests $P^2$, the five other of said funnel pipes $F^2$, leading from the other funnels under the remaining five compartments of the filling box $A'$, open over and into the orifices of the cans in place upon the series of can rests $Q^2$, and five of the funnel pipes $G^2$, leading from five of the funnels under the compartments F of the filling box $A'$, open over and into the orifices of the cans in place upon the can rests of the series $R^2$, the other five of the funnel pipes $G^2$, leading from the funnels under the remaining five compartments F of the filling box $A'$, open over and into the orifices of the cans in place upon the can rests of the series $S^2$.

Each of the exit ends of the filling pipes $F^2$ $G^2$ is provided with a drip cup or pan $C^3$, pivotally supported at one end upon a post $D^3$ revolubly mounted on a bar $E^3$, which bar is suitably mounted on and attached to said pipes. The drip cups of all of said pipes are pivotally connected together by a tie rod $F^3$, to this tie rod are pivotally connected the levers $G^3$, $H^3$, and the forked levers $I^3$ $J^3$, this system of levers is attached to and supported upon a bracket attached to the rod $E^3$.

$A^3$ is a lever, pivoted at its lower end, and supported in any convenient manner, adapted in its forward movement to come into contact with the lever arm $J^3$ and shift the drip boxes $C^3$ from under the exit orifices of the pipes $F^2$ $G^2$, and, at the same time, take into a slot or seat $B^3$ in the periphery of the turn table and lock the turn table in position, and, in its backward movement, to come into contact with the lever arm $I^3$ and shift the drip-boxes $C^3$ into position under the orifices of the feed-pipes $F^2$ $G^2$, and, at the same time unlock the turn table to permit its further revolution by means of force applied to the handle $Z^2$. The feed-pipes $F^2$ and $G^2$, are, at their lowest parts, provided with water-tap or drain pipes $U^2$ $V^2$, which, at proper intervals, may be opened to permit of the escape of such water as has collected in said pipes. The turn table $J^2$ is surrounded and inclosed by an iron tank N. The diameter of this tank is but large enough to permit of the inclusion therein of the turn table and the filling pipes $F^2$ $G^2$. This tank, upon its outer periphery, is provided with a water seal $N^3$ made by riveting a flanged sheet of iron to the wall of the tank. The water seal is provided with a water supply pipe $L^3$ and a water overflow $M^3$.

$O^3$ is a hood having depending sides, and a dome roof provided with doors $V^3$ each hinged at one end, so as to open upwardly, and, at the other end, provided with a guard to limit its upward movement and occasion its return, by gravity, to its seat. This hood is adapted to slide vertically upon the post $K^2$, and it is supported, in an elevated position above the turn table, by a rope or wire $P^3$ which, at one end, is attached to said hood, passed over suitable pulleys, and, at the other end, attached to a windlass $Q^3$. This hood, at its outer periphery, is provided with pulleys $R^3$ which rest against and are adapted to travel upon tracks $S^3$ upon the vertical posts $N^2$. Counter weights $T^3$, attached to cords passed over suitably supported pulleys, are attached to the hood $O^3$ to assist in its support. The rope $P^3$, by which the hood $O^3$ is supported, is provided with a stop $Y^3$, which, upon the descent of the hood $O^3$, is adapted to force downward the free end of the lever $Z^3$, (said lever, at its other end, being pivoted to a supporting rod $A^4$,) and, by means of the valve stem $B^4$, to withdraw the valve $C^4$ from its seat and permit steam to be fed from and through the steam supply pipe $D^4$ to the hollow central post $K^2$, and through steam openings $F^4$ $F^4$ in said post to the interior of the hood $O^3$.

$E^4$ is a steam packing joint between the steam pipe $D^4$ and the post $K^2$.

$U^3$ is a flange, or stop, attached to the outer wall of the hood $O^3$ and adapted to come into contact with the upper edge of the water seal $N^3$ and determine and limit the downward movement of the hood $O^3$. The feed pipes $F^2$, $G^2$ are each, at points near the funnels $D^2$ $E^2$, provided with a valve $H^2$ having a valve ball $I^2$ of wood or of other material adapted to float and close said feed pipe, and to be depressed and open said feed pipe upon the supply to the funnels $D^2$ $E^2$ of oil.

The feed pipes $F^2$ $G^2$ are each, at their ends adjacent to the turn table, provided with a valve $Y^2$ having a valve ball $X^2$ made of metal, or of material adapted to by gravity fall and close said pipes, and to, by the passage of oil through said pipes in the direction of and toward the turn table, rise and open said pipes. The purpose of said valves $H^2$ and $Y^2$ is to prevent a back movement of the oil in the pipes $F^2$ $G^2$ in a direction from the turn table toward the filling boxes.

Such being the construction of my apparatus its mode of operation is as follows:—The filling boxes $A'$ $A''$ $A'''$ are, by proper manipulation of the valves $A^2$ $B^2$ $C^2$, filled with oil from the pipes V X and Y. When each of these filled boxes has been provided with a predetermined and desired quantity of oil, the fact will be shown by the pointing device U which will indicate upon a scale the number of pounds of oil contained therein. The filling boxes will then be ready to be discharged of their contents. This fact is communicated by the operator in charge of the filling boxes to the operator in charge of filling the cans by the depression of the handle S and the elevation of the guard Q, by this the last named operator will be advised of the fact that the filling box to which the handles N and N' belong is ready to be tapped. The same signal is to be given as to the boxes $A''$ and $A'''$. The cans being in place upon the turn table, as shown in Fig. 3, the filling boxes having been filled as described, and the feed pipes $F^2$ $G^2$ having been filled with oil so that additional amounts of oil fed thereinto will cause a displacement of like quantities therefrom,—the operator in charge of filling the cans depresses the handle N and opens the valves of the ten compartments A of the filling box $A'$ whereby the contents of each of said compartments is by one of the pipes $F^2$, conveyed to and discharged into one of the ten cans of one of the series $P^2$ $Q^2$ of cans on the turn table. The turn table $J^2$ Fig. 3, is now turned, in the direction of the arrow, one fifth of its circumference, by which movement the cans upon the series $P^2$ $Q^2$ of the can rests are brought into position under the nozzles of the feed pipes $G^2$ as shown at $R^2$ $S^2$. The operator in charge of filling the cans now depresses the handle N' whereby the valves in each of the compartments F are opened, and the contents of each of said compartments, by the feed pipes $G^2$, conveyed to the respective cans in series $R^2$ $S^2$. The compartments of the filling box $A^2$ having been emptied, this fact is, by the operator in charge of it, communicated to the operator in charge of the turn table, by the dropping or return of the guard Q into contact with the handle N, and the valves of the compartments of said filling box $A'$ return to their seats. This filling box is then to be refilled with oil from the service pipe Z, in the meantime one of the boxes $A''$ $A'''$ is to be emptied of its contents by the operator in charge of the turn table, and so the boxes $A'$ $A''$ $A'''$ are to be successively filled, allowed to settle, and tapped, the operation being such that in one filling box the operation of drawing off into the cans is being carried on, and in another filling box the operation of permitting the foam to settle is being carried on, and in the third the operation of filling said box with oil is being carried on, the process being thus rendered continuous.

The capacity of the larger compartments of the filling box being, as has been stated, twenty eight pounds, and the capacity of each of the smaller compartments of said filling box being about four and one half pounds, it will be understood that the cans upon the series $P^2$ $Q^2$ of the can rests will each receive twenty-eight pounds of oil from the feed pipes $F^2$, and that upon being moved into the position $R^2$ $S^2$ will receive four and one half pounds of oil from the feed pipes $G^2$. The oil foam resulting from drawing oil from the filling pipes $F^2$ will subside in the transit of the cans from the position $P^2$ $Q^2$ under the pipes $F^2$, to the position $R^2$ $S^2$ under the pipes $G^2$, and the pipes $G^2$ are of a size sufficiently small to prevent the formation of much foam by the escape of oil therefrom. The cans upon the remaining series of can rests upon the turn table are in the manner above described presented to the filling pipes $F^2$ and $G^2$, with the result that the operation of filling the cans is rendered as continuous and expeditious as by methods heretofore employed for the purpose,—the formation of foam, and the overflow of oil from the can, at the time of soldering and sealing it, being thus prevented.

The location of the filling boxes and their attachments in a fire proof compartment, separate or remote from the building in which the turn table is located, removes from the vicinity of the soldering operation the atmosphere of petroleum vapor or mist hitherto due to the rapid inflow of oil from the service pipe to the filling boxes. The operation of partially filling the cans rapidly, and then permitting the foam thus formed to subside, and completing the filling of the cans slowly and without the formation of foam, to a great degree prevents the formation of petroleum vapor or mist at the turn table and in the soldering room.

In case of accidental explosion or fire in the compartment in which the turn table is situated, the rope or cable $P^3$ attached to the windlass $Q^3$, (which windlass is best located outside the building or compartment in which the turn table is situated,) may be cut or severed, whereby the hood $O^3$ will be permitted, by gravity, to drop, and, its depending flange to sink into the water seal $N^3$,—and thus inclose and smother the fire.

The chamber formed by the descent of the hood $O^3$ is by the automatic opening of the steam valve $C^4$ at once filled with steam from the orifices $F^4 F^4$.

It is proper to state that the improved method of filling cans with petroleum which the apparatus hereinbefore described is adapted to carry out, forms the subject of a separate application for Letters Patent filed by me in the United States Patent Office upon the 7th day of February, 1888, as Serial No. 263,236.

Having thus described my invention, I claim—

1. In an apparatus for filling cans with liquids, in combination, a filling box provided with a series of compartments of equal size, and with a series of a like number of smaller compartments of equal size, the compartments of both of said series, at their lower ends, being provided with exit orifices and valves, a turn table, provided with two or more series of cans supported upon its periphery, and feed pipes leading from one series of said compartments of said filling box to points opposite to and above the can orifices of one series of cans on the turn table, and feed pipes leading from a second series of smaller compartments of said feed box to points opposite to and above the can orifices of an equal number of cans of a second and adjacent series of cans on the turn table, as and for the purpose specified.

2. In an apparatus for filling cans with liquids, a filling box provided with one or more series of compartments, and with a like number of series of a like number of smaller compartments, all of said compartments being provided with outlet orifices and with valves, each of the valves of each of said series of compartments being connected with one end of a wire or rope adapted to operate the same, the other end of said wire or rope being provided with a handle, and with a guard so attached thereto as to be capable of adjustment to, at will, permit of or prevent said handle being grasped, said guard being provided with a wire or cord attached thereto for adjusting said guard into or out of contact with said handle, as specified.

3. In an apparatus for filling cans, in combination, a turn table, provided upon its periphery with one or more series of can rests, each series having a like number of said rests, a series of feed pipes, the exit ends of which open over and into the orifices of the cans of one or more of said series,—a second series of an equal number of smaller feed pipes, the exit ends of which open over and into the orifices of the next adjoining series of cans, as and for the purpose specified.

4. In an apparatus for filling cans, in combination, a series of filling boxes, each of which is divided into a given number of compartments, of which one half are of greater capacity than the other half, and of which each has a valve provided bottom opening; a turn table adapted to support a series of cans to be filled; a series of conduits, equal in number to the number of said compartments, and being, as to one half of their number, of greater diameter than the other half, said large and small conduits being, at one end, in position to receive the discharge from the valved openings of the large and small compartments respectively, and, at their other ends, terminating in nozzles which overhang the periphery of said turn table,—a metal hood or dome supported over the turn table, and means for raising and lowering said dome, substantially as set forth.

5. In an apparatus for filling cans, in combination, a series of filling boxes, each of which is divided into a given number of compartments of which one half are of greater capacity than the other half, and of which each has a valve-provided bottom opening; a turn table adapted to support a series of cans to be filled; a series of conduits equal in number to the said given number of compartments, and being, as to one half their number, of greater diameter than the other half, said large and small conduits being, at one end, in position to receive the discharge from the valved openings of the large and small compartments respectively, and at their other ends terminating in nozzles overhanging the periphery of said turn table,—a metal hood or dome supported above the turn table, provided with upwardly opening doors in its top, means for raising and lowering said dome, and vertical guide posts to guide it in its vertical movement, substantially as set forth.

6. In an apparatus for filling cans, in combination, a series of filling boxes, each of which is divided into a given number of compartments of which one half are of greater capacity than the other half, and of which each has a valve-provided bottom opening; a turn table adapted to support a series of cans to be filled; a series of conduits equal in number to the said given number of compartments, and being, as to one half of their number, of greater diameter than the other half, said large and small conduits being at one end in position to receive the discharge from the valved openings of the large and small compartments respectively, and at their other ends, terminating in nozzles, and overhanging the periphery of said turn table,—a wall surrounding said turn table, and provided with a trough or water seal,—a metal hood or dome supported above the turn table, and means for vertically moving said dome into or out of said water seal, substantially as set forth.

7. In an apparatus for filling cans, in combination, a series of filling boxes, each of which is divided into a given number of compartments of which one half are of greater capacity than the other half, and of which each has a valve-provided bottom opening; a turn table adapted to support a series of cans to be filled; a series of conduits equal in number to the said given number of compartments, and being, as to one half their number, of greater diameter than the other half, said large and small conduits being, at one end, in position to receive the discharge from the valved openings of the large and small compartments respectively, and, at their other ends, terminating in nozzles and overhanging the periphery of said turn table,—a water seal surrounding said turn table, a metal hood or dome supported above said turn table, means for lowering said dome into said water seal so as to completely inclose said turn table, and a hollow metal post upon which said turn table is mounted, in communication, by means of a pipe, with a steam supply, and provided, intermediate of its length, with steam escape openings, substantially as described.

8. In an apparatus for filling cans, in combination, a series of filling boxes, each of which is divided into a given number of compartments of which one half are of greater capacity than the other half, and of which each has a valve-provided bottom opening; a turn table adapted to support a series of cans to be filled; a series of conduits equal in number to the said given number of compartments, and being, as to one half their number, of greater diameter than the other half, said large and small compartments being, at one end, in position to receive the discharge from the valved openings of the large and small compartments respectively, and, at their other ends, terminating in nozzles, each size being grouped by itself, and overhanging the periphery of said turn-table,—a wall surrounding said turn table, a metal hood or dome supported above said turn table, means for lowering said dome upon said wall so as to completely inclose said turn table, a hollow metal post upon which said turn table is mounted, in communication, by means of a pipe, with a steam supply, and provided, intermediate of its length, with steam escape openings, a valve seated in said steam pipe, and provided with a valve lever, a trip device connected to the dome, which, when the dome is lowered acts upon the valve lever and opens the valve, substantially as set forth.

9. In an apparatus for filling cans, a series of filling boxes, each of which is divided into a given number of compartments, of which one half are of greater capacity than the other half, and of which each has a valve-provided bottom opening; a turn table adapted to support and hold in place a series of cans to be filled, provided with a handle whereby it may be rotated, and with a device for locking it in given positions; a series of conduits equal in number to the said given number of compartments, and being, as to one half their number, of greater diameter than the other half, said large and small conduits being, at one end, in position to receive the discharge from the valved openings of the large and small compartments respectively, and, at their other ends, terminating in nozzles, each size being grouped by itself, and overhanging the periphery of said turn table, substantially as set forth.

10. In an apparatus for filling cans, in combination, a series of filling boxes, each of which is divided into a given number of compartments of which one half are of greater capacity than the other half, and each of which has a valve-provided bottom opening; a series of conduits equal in number to the said given number of conduits, and being, as to one half of their number, of greater diameter than the other half, said large and small conduits being, at one end, in position to receive the discharge from the valve openings of the large and small compartments respectively, and, at their other ends, terminating in nozzles, and overhanging the periphery of said turn table,—a metal hood or dome supported over said turn table, means for raising and lowering said dome, and counter-balances connected with said dome, substantially as set forth.

11. In an apparatus for filling cans, in combination, a series of filling boxes, each of which is divided into a given number of compartments of which one half are of greater capacity than the other half, and each of which has a valve provided bottom opening; a turn table adapted to support a series of cans to be filled; a series of conduits equal in number to the said given number of compartments, and being, as to one half their number, of greater diameter than the other half, said large and small compartments being, at one end, in position to receive the discharge from the valved openings of the large and small compartments respectively, and, at their other ends, terminating in nozzles which overhang the periphery of the turn table,—a valve located in each of said conduits to prevent the back flow of its contents, substantially as set forth.

12. In an apparatus for filling cans, in combination, a series of filling boxes, each of which is divided into a given number of compartments of which one half are of greater capacity than the other half, and each of which has a valve-provided bottom opening; a turn table adapted to support a series of cans to be filled; a series of conduits equal in number to the said given number of compartments, and being, as to one half their number, of greater diameter than the other half, said large and small conduits being, at one end, in position to receive the discharge from the valved openings of the large and small compartments respectively, and, at their other ends, terminating in nozzles overhanging the periphery of said turn table,—an adjustable drip cup supported under each of said nozzles, and means for shifting them into and out of such position, substantially as set forth.

In testimony whereof I have hereunto signed my name this 15th day of July, A. D. 1887.

GEORGE H. PERKINS.

In presence of—
WM. C. STRAWBRIDGE,
J. BONSALL TAYLOR.